United States Patent
Schroeder et al.

(10) Patent No.: US 11,820,203 B2
(45) Date of Patent: Nov. 21, 2023

(54) METHOD FOR DEFROSTING AN EXTERNAL HEAT EXCHANGER, WHICH IS OPERATED AS AN AIR HEAT PUMP, OF A COOLING SYSTEM FOR A MOTOR VEHICLE, COOLING SYSTEM, AND MOTOR VEHICLE HAVING SUCH A COOLING SYSTEM

(71) Applicant: AUDI AG, Ingolstadt (DE)

(72) Inventors: Dirk Schroeder, Manching (DE); Christian Rebinger, Munich (DE); Helmut Rottenkolber, Mindelstetten (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/801,601

(22) PCT Filed: Dec. 15, 2020

(86) PCT No.: PCT/EP2020/086063
§ 371 (c)(1),
(2) Date: Aug. 23, 2022

(87) PCT Pub. No.: WO2021/185475
PCT Pub. Date: Sep. 23, 2021

(65) Prior Publication Data
US 2023/0096213 A1    Mar. 30, 2023

(30) Foreign Application Priority Data

Mar. 19, 2020  (DE) .................. 102020107652.5

(51) Int. Cl.
*B60H 1/32* (2006.01)
(52) U.S. Cl.
CPC .......... *B60H 1/321* (2013.01); *B60H 1/3228* (2019.05)

(58) Field of Classification Search
CPC .. B60H 1/321; B60H 1/3228; B60H 1/00921; B60H 2001/00964; F25B 2600/2519;
(Continued)

(56) References Cited

FOREIGN PATENT DOCUMENTS

| CN | 107757298 A | * | 3/2018 | ......... B60H 1/00278 |
| CN | 109334392 A | * | 2/2019 | ......... B60H 1/00271 |

(Continued)

OTHER PUBLICATIONS

Examination Report dated Oct. 28, 2020, in connection with corresponding German Application No. 10 2020 107 652.5 (10 pp., including machine-generated English translation).
(Continued)

*Primary Examiner* — Emmanuel E Duke
(74) *Attorney, Agent, or Firm* — Maier & Maier, PLLC

(57) ABSTRACT

A method for defrosting an external heat exchanger, operated as an air heat pump evaporator, of a cooling system for a motor vehicle. The cooling system includes a refrigerant compressor connected to a primary and secondary section; an external heat exchanger; an evaporator; a heating register; a primary section valve which is closed in the air heat pump operation; and a secondary section valve which is open in the air heat pump operation. The method includes closing of the secondary section valve; opening of the primary section valve, so that refrigerant flows directly from the refrigerant compressor to the external heat exchanger; and setting an inlet-side pressure level of the refrigerant on the external heat exchanger to a target pressure which corresponds to a condensation temperature (Tkond) of the refrigerant in the range: 2° C.≤Tkond≤20° C., in particular 4° C.≤Tkond≤10° C.

13 Claims, 2 Drawing Sheets

(58) Field of Classification Search
CPC ...... F25B 5/02; F25B 5/04; F25B 6/02; F25B 6/04; F25B 25/005; F25B 40/00; F25B 41/24; F25B 47/022
See application file for complete search history.

(56) References Cited

FOREIGN PATENT DOCUMENTS

| | | | | |
|---|---|---|---|---|
| CN | 210089206 U | 2/2020 | | |
| DE | 10201741 A1 | 8/2003 | | |
| DE | 102013110224 A1 * | 3/2014 | ......... | B60H 1/00878 |
| DE | 102013110224 A1 | 3/2014 | | |
| DE | 102014102078 A1 * | 8/2015 | ........... | B60H 1/0073 |
| DE | 102014102078 A1 | 8/2015 | | |
| DE | 112014003184 T5 | 3/2016 | | |
| DE | 102017110560 A1 | 11/2018 | | |
| EP | 2821727 A1 | 1/2015 | | |

OTHER PUBLICATIONS

International Preliminary Report on Patentability with English translation of Written Opinion dated Sep. 20, 2022, in corresponding International Application No. PCT/EP2020/086063; 20 pages.
International Search Report with English translation dated Mar. 1, 2021, in corresponding International Application No. PCT/EP2020/086063; 5 pages.

* cited by examiner

METHOD FOR DEFROSTING AN EXTERNAL HEAT EXCHANGER, WHICH IS OPERATED AS AN AIR HEAT PUMP, OF A COOLING SYSTEM FOR A MOTOR VEHICLE, COOLING SYSTEM, AND MOTOR VEHICLE HAVING SUCH A COOLING SYSTEM

FIELD

A method for defrosting an external heat exchanger, which is operated as an air heat pump evaporator, of a cooling system for a motor vehicle, to a cooling system as well as to a motor vehicle having such a cooling system.

BACKGROUND

For air heat pumps, heat bound in the ambient air is usually used in order to evaporate a refrigerant, optionally to heat it, that is to say to transfer heat to it, so that said heat, together with the heat introduced via the compressor, can be used to heat an air flow for the interior of a motor vehicle. Here, the refrigerant is brought to an evaporation pressure level or evaporation temperature level below that of the ambient environment, so that heat can be drawn from the ambient air. Here, the ambient air undergoes cooling, which can have the result that humidity precipitates from the ambient air and is deposited on the air heat pump evaporator or the external heat exchanger and freezes there. Accordingly, on the external heat exchanger, a layer of frost forms, which makes it difficult for the ambient air flow to flow through the heat exchanger. This negatively influences the evaporation power, so that in the end the heating power of the air heat pump is no longer ensured or collapses.

In order to enable the defrosting of the external heat exchanger in a cooling system, warm or hot refrigerant which is at high pressure is led directly from the refrigerant compressor into the iced up external heat exchanger by adapted process interconnection. Due to the pressure change and the associated temperature jump from a cold low-pressure level (air heat pump operation) to a warm to hot high-pressure level, the temperature on the external heat exchanger can suddenly increase by 40 K or more. Such dynamic temperature changes can lead to stresses in the external heat exchanger so that, for example, joining sites, such as, for example, soldering sites, are greatly stressed, which can shorten the useful life of the external heat exchanger. Furthermore, such defrosting processes, in which the temperature level changes rapidly or abruptly, can occur multiple times in an operating cycle of the air heat pump.

Examples of such interconnections of refrigerant systems having an air heat pump can be found in EP 2 821 727 A1, DE 11 2014 003 184 T5 or DE 10 2017 110560 A1.

SUMMARY

The underlying problem of the invention is considered to be the indication of a method for defrosting the external heat exchanger which is operated as an air heat pump evaporator, in which the above disadvantages, in particular large temperature jumps, can be avoided.

Thus proposed is a method for defrosting an external heat exchanger, which is operated as an air heat pump evaporator, of a cooling system for a motor vehicle, wherein the cooling system comprises:

a refrigerant compressor which is connectable or connected to a primary section and a secondary section;

an external heat exchanger which is arranged in the primary section;

an evaporator which is arranged in the primary section;

a heating register (26) which is arranged in the secondary section (16);

a primary section valve (A4) arranged between the refrigerant compressor (12) and the external heat exchanger (18), which is closed in the air heat pump operation;

a secondary section valve (A3) arranged between the refrigerant compressor (12) and the heating register (26), which is open in the air heat pump operation.

The method includes the following steps:

closing of the secondary section valve (A3);

opening of the primary section valve (A4), so that refrigerant flows directly from the refrigerant compressor (12) to the external heat exchanger;

setting inlet-side pressure level of the refrigerant on the external heat exchanger to a target pressure which corresponds to a condensation temperature (Tkond) of the refrigerant in the following range:

$$2° C. \leq Tkond \leq 20° C., \text{ in particular } 4° C. \leq Tkond \leq 10° C.$$

Thereby, the rapid or abrupt heating of the iced up external heat exchanger during the defrosting is avoided. The refrigerant is set to a pressure level at which the condensation temperature is at a value which is (clearly) above the freezing point of water, so that the defrosting is enabled. However, the pressure level of the refrigerant and the associated temperature increase on the external heat exchanger can be limited or controlled in a targeted manner, so that the occurrence of thermally induced stresses on the external heat exchanger operating as an air heat pump evaporator can be reduced.

In the method, a closing device provided on the air-side on the external heat exchanger can be closed. The closing can here occur shortly before or substantially simultaneously with the closing of the secondary section valve or the opening of the primary section valve. Thereby, an ambient air-side flow into or through the external heat exchanger can be prevented, so that the defrosting process can be accelerated, since little or no cooling ambient air, drawing heat from the refrigerant flowing through the heat exchanger and thus delaying or hindering the defrosting process, flows into or through the external heat exchanger.

The pressure level of the refrigerant can remain set at the target pressure until a refrigerant temperature (Tkm) measured on the outlet side on the external heat exchanger is greater than 0° C., in particular corresponds to the condensation temperature (Tkond), for a predetermined duration. Thereby, it can be determined with great certainty that the external heat exchanger has been completely defrosted or deiced, since little or no heat is delivered to the (initially) cold and frost-covered surface of the heat exchanger.

After the desired refrigerant temperature has been reached, a fan device can be switched on, in order to dry the external heat exchanger, in particular to expel condensate present on the external heat exchanger. The aeration device can here also supply ambient air to the external heat exchanger, wherein this occurs in particular at air temperatures above the freezing point, so as not to immediately again bring about icing up of the condensate. The supply of an air flow to the external heat exchanger can also be associated with an at least partial opening of the air-side closing device.

During the operation of the fan device, the pressure level of the refrigerant can be set or maintained so that an exterior surface temperature of the external heat exchanger is 4° C. or higher. Thereby, it is ensured that the expulsion of condensate and thus the drying of the external heat exchanger can be carried out efficiently.

The inlet-side pressure level can be brought to the target pressure by setting the power consumption of the refrigerant compressor and/or by setting the opening of an expansion valve associated with a chiller operating, for example, as water heat pump evaporator. Thereby, the desired pressure level (target pressure) for defrosting the external heat exchanger can be set taking into consideration at least one operating parameter of the cooling system.

The above problem is also solved by a cooling system with heat pump function for a motor vehicle, having a refrigerant compressor which is connectable or connected to a primary section and a secondary section;

an external heat exchanger which is operated or operatable as air heat pump evaporator, which is arranged in the primary section;

an evaporator which is arranged in the primary section;

a heating register which is arranged in the secondary section;

a primary section valve arranged between the refrigerant compressor and the external heat exchanger;

a secondary section valve arranged between the refrigerant compressor and the heating register, wherein it is provided that the cooling system is configured to be operated with an above-described method for defrosting the external heat exchanger.

A motor vehicle can be equipped with such a cooling system. Here, the motor vehicle can in particular be an electric vehicle. In an electric vehicle, the efficient operation of the cooling system can lead to power savings, so that thereby a greater cruising range of the electric vehicle can be achieved.

BRIEF DESCRIPTION OF THE FIGURES

Additional advantages and details of the invention result from the following description of embodiments in reference to the figures. Here.

DETAILED DESCRIPTION

Figure 1:
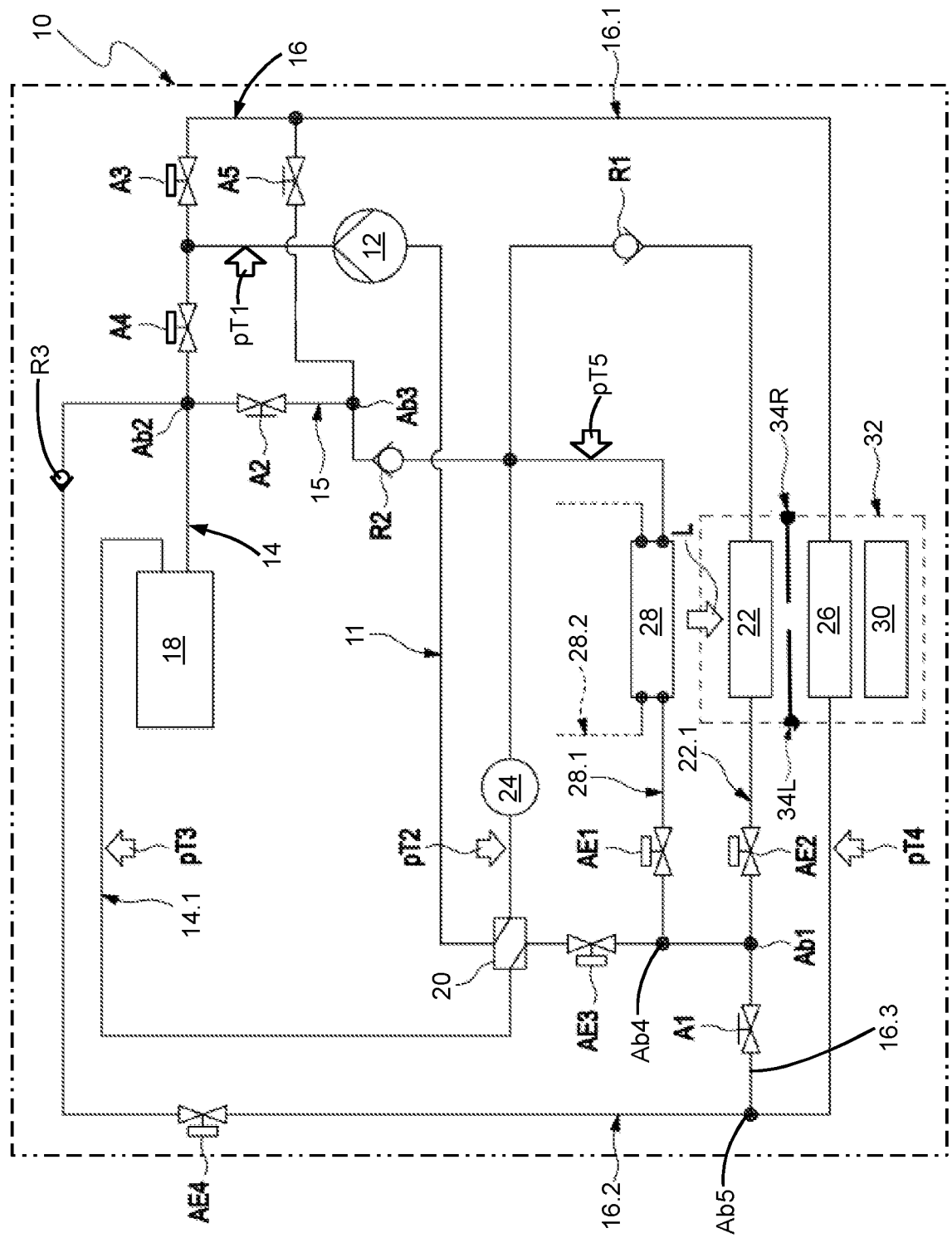
FIG. 1 shows a diagrammatic and simplified connection diagram of a cooling system for a motor vehicle.

In FIG. 1, an embodiment of a cooling system 10 for a motor vehicle is represented diagrammatically and in a simplified manner. The cooling system 10 includes a refrigerant circuit 11 which can be operated both in a cooling system operation (in short also referred to as AC operation) as well as in a heat pump mode, and also in afterheat and reheat mode which are not further described. In the embodiment shown, the cooling system 10 includes a refrigerant compressor 12, an external heat exchanger 18, an internal heat exchanger 20, an evaporator 22, and an accumulator or refrigerant collector 24. The external heat exchanger 18 can be designed as condenser or gas cooler. In particular, in the embodiment represented, the external heat exchanger 18 allows bidirectional throughflow.

The evaporator 22 is shown here as an example as front evaporator for a vehicle. The evaporator 22 is also representative of additional possible evaporators in a vehicle, such as, for example, rear evaporators, which can be fluidically arranged parallel to one another. In other words, the cooling system 10 thus includes at least one evaporator 22.

Downstream of the compressor 12, a shut-off valve A4 is arranged, which is referred to below as primary section valve A4. Upstream of the evaporator 22, an expansion valve AE2 is provided.

In the context of this description, in the entire refrigerant circuit 11 of the cooling system the section from the compressor 12 to the external heat exchanger 18, to the internal heat exchanger 20 and to the evaporator 22 is referred to as primary section 14.

The cooling system 10 moreover includes a heating register 26 (also referred to as heat condenser or heating gas cooler). Upstream of the heating register 26, a shut-off valve A3 is arranged, which is referred to below as secondary section valve A3. Downstream of the heating register 26, a shut-off valve A1 is arranged. Furthermore, downstream of the heating register 26, an expansion valve AE4 is arranged.

In the context of this description, in the entire refrigerant circuit of the cooling system 10, the section from the compressor 12 to the heating register 26, to the expansion valve AE4 and to a branch Ab2 is referred to as secondary section 16. The secondary section 16 includes a heating branch 16.1 which extends from the shut-off valve A3 via the heating register 26 to the shut-off valve A1. Moreover, the secondary section 16 includes an afterheat or reheat branch 16.2 which is fluidically connectable upstream to the heating register 26 and downstream to the external heat exchanger 18. Here, the secondary section 16 or the reheat branch 16.2 leads into the primary section 14 at a branch point Ab2.

The cooling system 10 includes an additional evaporator implemented as chiller 28. The chiller 28 is provided fluidically parallel to the evaporator 22. The chiller 28 can be used, for example, to cool an electrical component of the vehicle but also to implement a water heat pump function using the released heat of at least one electric component. An expansion valve AE1 is connected upstream of the chiller 28.

The cooling system 10 can also comprise an electric heating element 30 which is implemented, for example, as high-voltage PTC heating element. The electric heating element 30 is used as auxiliary heater for a supply air flow L led into the vehicle interior. Here, the electric heating element 30 together with the heating register 26 and the evaporator 22 can be accommodated in an air conditioner 32. Here, the electric heating element 30 can be arranged downstream of the heating register 26.

In FIG. 1, check valves R1 and R2 can furthermore also be seen. Furthermore, several sensors pT1 to pT5 for the acquisition of pressure or/and temperature of the refrigerant are also represented. It is pointed out that the number of sensors or their arrangement is shown here only as an example. A cooling system 10 can also comprise fewer or more sensors. In the example shown, as sensors, combined pressure/temperature sensors pT1 to pT5 are shown. However, it is also conceivable that sensors separate from one another are used for the measurement of pressure or temperature and are optionally also arranged spatially separate from one another along the refrigerant lines.

The cooling system 10 can be operated in different modes which are briefly described below.

In the AC operation of the refrigerant circuit 11, the refrigerant compressed to high pressure flows from the refrigerant compressor 12, with primary section valve A4 open and with secondary section valve A3 closed, into the external heat exchanger 18. From there, it flows to the high-pressure section of the internal heat exchanger 20 and to the completely open expansion valve AE3. Via a branch point Ab1, the refrigerant can flow to the expansion valve AE2 and into the vehicle interior evaporator 22 (evaporator section 22.1). In parallel or alternatively, the refrigerant can flow via a branch point Ab4 and the expansion valve AE1 into the chiller 28 (chiller section 28.1). From the evaporator 22 and/or the chiller 28, the refrigerant flows on the low-pressure side into the collector 24 and through the low-pressure section of the internal heat exchanger 20 back to the compressor 12.

In the AC operation, the heating branch 16.1 or the secondary section 16 is closed by means of the shut-off valve A3, so that the hot refrigerant cannot flow through the heating register 26. For recovery of refrigerant from the inactive heating branch 16.1, the shut-off device A5 designed as shut-off valve can be opened, so that the refrigerant can flow in the direction of the collector 24 via the shut-off device A5 and the check valve R2, with simultaneously closed shut-off device A2.

In the heating operation of the refrigerant circuit 11, the primary section valve A4 is closed and the secondary section valve A3 is open, so that hot refrigerant can flow into the heating branch 16.1.

For carrying out the heating function by means of the chiller 28 for implementing a water heat pump operation, the refrigerant compressed by means of the refrigerant compressor 12 flows via the open shut-off valve A3 into the heating register 26. On the heating register 26, heat is delivered to a supply air flow L led into the vehicle interior. Subsequently, the refrigerant flows via the open shut-off valve A1 and the branch point Ab1. By means of the expansion valve AE1, the refrigerant is depressurized in the chiller 28 for receiving released heat of the electrical and/or electronic components arranged in a coolant circuit 28.2. In this heating function, the expansion valves AE3 and AE4 are closed, the shut-off valve A5 is closed, and the shut-off valve A2 is open. Here, via the shut-off valve A2, refrigerant precipitated in the water heat pump operation is suctioned out of a bidirectional branch 14.1 or the primary section 14 and supplied via the check valve R2 to the collector 24.

A delta connection (indirect) can be implemented in that, with shut-off valve A1 open, the refrigerant compressed by the refrigerant compressor 12 is depressurized by means of the expansion valve AE1 into the chiller 28, wherein simultaneously, on the coolant-side, that is to say in the coolant circuit 28.2, no mass flow is generated, that is to say, for example, the fluid used as coolant, such as, for example, water or water-glycol mixture, remains on the coolant side of the chiller 28 or coolant does not actively flow through the chiller 28. The expansion valves AE2, AE3 and AE4 in this connection variant remain closed.

For carrying out the heating function by means of the air heat pump operation via external heat exchanger 18 as heat pump evaporator, the refrigerant compressed by means of the refrigerant compressor 12 flows via the opened shut-off valve A3, for the release of heat to a supply air flow L, into the heating register 26. Subsequently, it is depressurized via the open shut-off valve A1 by means of the expansion valve AE3 into the external heat exchanger 18 for receiving heat from the ambient air. Subsequently, the refrigerant flows via a heat pump return branch 15 to the collector 24 and back to the refrigerant compressor 12. In the heat pump return branch 15, a shut-off valve A2 is provided, which is open in the air heat pump operation. The expansion valves AE1, AE2 and AE4 here remain closed as does the shut-off valve A5. In this air heat pump operation, icing up on the external heat exchanger 18 can occur, as already described in the introduction.

The possibilities of combined operation of a water heat pump interconnection and an air heat pump interconnection, analogously to the reheat operation, will not be further discussed.

For the subsequent description of the method for defrosting the external heat exchanger 18, it is assumed that the cooling system is initially in the air heat pump operation, as described above.

Figure 2:
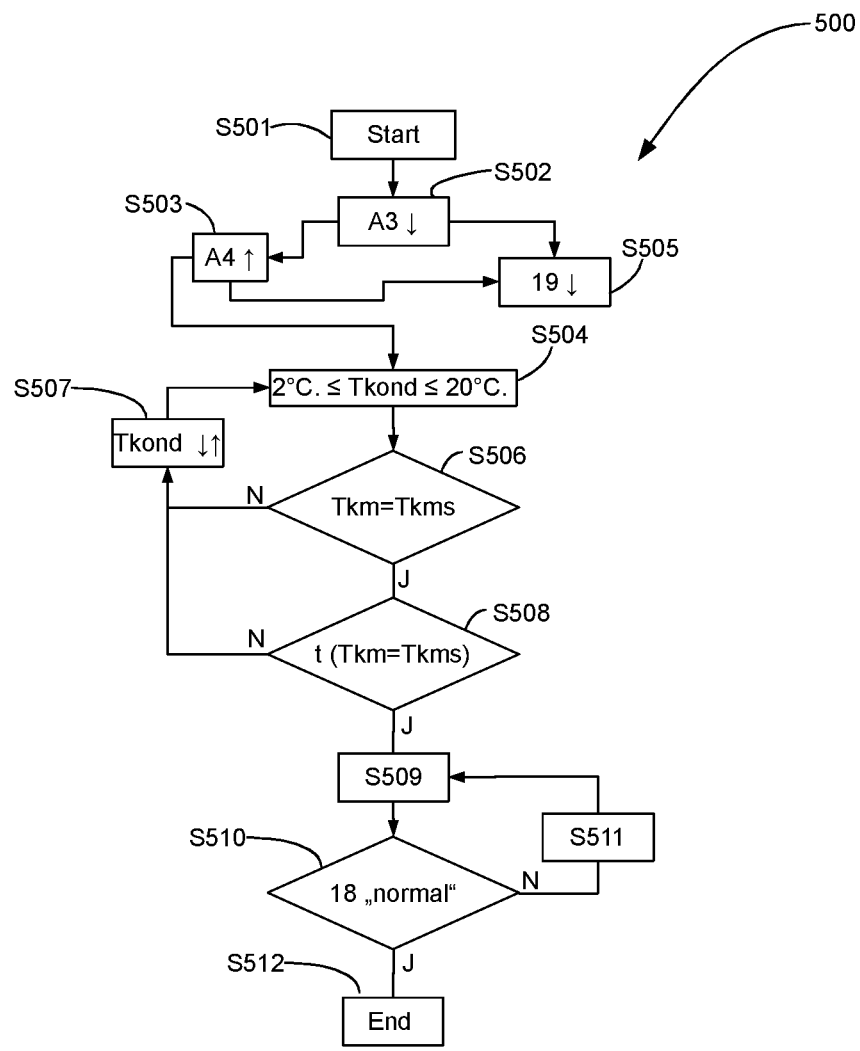
FIG. 2 shows a flow chart of an exemplary implementation of the method for defrosting the external heat exchanger, in particular by means of the cooling system described in FIG. 1.

The method 500 is described as an example below in reference to FIG. 2. The method 500 for defrosting an external heat exchanger is started if, during the air heat pump operation, based on operating parameters of the cooling system 10, an at least partial or incipient icing up of the external heat exchanger 18 is detected, which is illustrated by step S501. Possible operating parameters which indicate (partial) icing up, for example, can be the following:

The air quantity via the ambient heat exchanger as air heat pump evaporator is reduced, the pressure losses at constant fan actuation increase;

At steady heating demand and low-pressure level, the compressor speed of rotation and the high pressure in the cooling circuit continuously decrease.

If, in the method 500, an at least partial icing up of the external heat exchanger 18 is detected, the secondary section valve A3 is closed according to step S502. Subsequently or substantially simultaneously, the primary section valve A4 is opened (S503), so that refrigerant flows directly from the refrigerant compressor 12 to the external heat exchanger 18.

According to step S504, an inlet-side pressure level of the refrigerant on the external heat exchanger 18 is set to a target pressure which corresponds to a condensation temperature (Tkond) of the refrigerant in the following range:

$$2° \text{ C.} \leq \text{Tkond} \leq 20° \text{ C., in particular } 4° \text{ C.} \leq \text{Tkond} \leq 10° \text{ C.}$$

According to step S505, which can be carried out, for example, before or substantially with, or optionally (very shortly) after steps S503 or S504, a closing device 19 optionally provided on the air-side on the external heat exchanger 18, (FIG. 1) can be closed. By closing the closing device 19, cooling ambient air is prevented form flowing through the external heat exchanger 18.

According to step S506, it is verified whether a refrigerant temperature Tkm has reached a desired target temperature Tkms on the outlet side on the external heat exchanger 18. Here, the target temperature Tkms is predetermined or specified to be greater than 0° C.; in particular the target temperature Tkms can be selected to be substantially equal to the condensation temperature Tkond, that is to say in a range from 2° C. to 20° C., in particular 4° C. to 10° C. If this is not the case, according to step S507, the pressure level of the refrigerant remains set at the target pressure until the refrigerant temperature Tkm measured on the outlet side on the external heat exchanger 18 reaches the target temperature Tkms. If the target temperature Tkms is reached, it is verified according to step S508 whether the target temperature Tkms is present for a predetermined duration. This duration can be set or selected to be, for example, approximately 10 seconds to approximately 120 seconds.

For the acquisition of said refrigerant exit temperature Tkm on the external heat exchanger 18, it is advantageous if said heat exchanger comprises upstream a temperature measurement site for medium or surface temperature acquisition, in order to be able to report back a correspondingly required signal value. Here, the sensor pT3 (FIG. 1) as combination sensor of pressure and temperature signals or a separate temperature sensor can perform this task.

After the desired refrigerant temperature Tkm has been reached, wherein Tkm is substantially equal to the target temperature Tkms, according to step S509, a fan device can be switched on in order to dry the external heat exchanger 18, in particular in order to expel condensate present on the external heat exchanger 18.

During the operation of the fan device (S509), it is verified whether the external heat exchanger 18 is (sufficiently) dried, which is illustrated in step S510 by the use of the term "normal." If the drying of the external heat exchanger 18 is to be carried out even longer, according to step S511, the pressure level in the refrigerant is set or maintained such that an exterior surface temperature of the external heat exchanger 18 is 4° C. or higher. If the drying of the external heat exchanger 18 is completed, the method 500 for defrosting the external heat exchanger 18 can be terminated (S512).

The inlet-side pressure level set according to S504 is brought to the target pressure by setting the power consumption of the refrigerant compressor 12 or/and by setting the opening of the expansion valve AE1 which is associated with the chiller 28 operating as water heat pump. Said target pressure can be provided via a combination sensor of pressure and temperature signals pT1 or via a separate pressure sensor.

In an additional embodiment of the air heat pump evaporator, the latter can also comprise an indirect evaporation (heat transfer from air to intermediate fluid and then from intermediate fluid to the refrigerant) instead of an implementation of a direct evaporation (heat transfer from air to refrigerant). In this case as well, the method presented here can be applied in principle. However, in this case, the ambient intermediate fluid heat exchanger is defrosted. Correspondingly, via the cooling circuit, it is not the pressure and thus the temperature in the refrigerant which is set above the freezing point, but instead the intermediate medium temperature is raised until the temperature from the inlet to the outlet of the ambient intermediate fluid heat exchanger temperature is higher than 0° C. Thereby it can also be ensured that a layer of frost on the ambient intermediate fluid heat exchanger has thawed.

The invention claimed is:

1. A method for defrosting an external heat exchanger, which is operated as an air heat pump evaporator, of a cooling system for a motor vehicle, wherein the cooling system includes a refrigerant compressor which is connectable or connected to a primary section and a secondary section; an external heat exchanger which is arranged in the primary section; an evaporator which is arranged in the primary section; a heating register which is arranged in the secondary section; a primary section valve arranged between the refrigerant compressor and the external heat exchanger, which is closed in the air heat pump operation; a secondary section valve arranged between the refrigerant compressor and the heating register, which is open in the air heat pump operation; and the method includes the following steps:

Closing of the secondary section valve;

opening of the primary section valve, so that refrigerant flows directly from the refrigerant compressor to the external heat exchanger;

setting an inlet-side pressure level of the refrigerant on the external heat exchanger to a target pressure which corresponds to a condensation temperature (Tkond) of the refrigerant in the following range:

2° C.≤Tkond≤20° C., in particular 4° C.≤Tkond≤10° C.

2. The method according to claim 1, wherein a closing device provided on the air side on the external heat exchanger is closed.

3. The method according to claim 2, wherein the pressure level of the refrigerant remains set at the target pressure until a refrigerant temperature measured on the outlet side on the external heat exchanger is greater than 0° C., in particular corresponds to the condensation temperature, for a predetermined duration.

4. The method according to claim 2, wherein the inlet-side pressure level is brought to the target pressure by setting a power consumption of the refrigerant compressor and/or by setting an opening of an expansion valve which is associated with a chiller operating as water heat pump.

5. The method according to claim 1, wherein the pressure level of the refrigerant remains set at the target pressure until a refrigerant temperature (Tkm) measured on the outlet side on the external heat exchanger is greater than 0° C., in particular corresponds to the condensation temperature, for a predetermined duration.

6. The method according to claim 5, wherein, after reaching the desired refrigerant temperature, a fan device is switched on, in order to dry the external heat exchanger, in particular in order to expel condensate present on the external heat exchanger.

7. The method according to claim 6, wherein, during the operation of the fan device, the pressure level of the refrigerant is set or maintained so that an exterior surface temperature of the external heat exchanger is 4° C. or higher.

8. The method according to claim 7, wherein the inlet-side pressure level is brought to the target pressure by setting a power consumption of the refrigerant compressor and/or by setting an opening of an expansion valve which is associated with a chiller operating as water heat pump.

9. The method according to claim 6, wherein the inlet-side pressure level is brought to the target pressure by setting a power consumption of the refrigerant compressor and/or by setting an opening of an expansion valve which is associated with a chiller operating as water heat pump.

10. The method according to claim 5, wherein the inlet-side pressure level is brought to the target pressure by setting a power consumption of the refrigerant compressor and/or by setting an opening of an expansion valve which is associated with a chiller operating as water heat pump.

11. The method according to claim 1, wherein the inlet-side pressure level is brought to the target pressure by setting a power consumption of the refrigerant compressor and/or by setting an opening of an expansion valve which is associated with a chiller operating as water heat pump.

12. A cooling system with heat pump function for a motor vehicle, comprising:

a refrigerant compressor which is connectable or connected to a primary section and a secondary section;

an external heat exchanger operated or operable as air heat pump, which is arranged in the primary section;

an evaporator which is arranged in the primary section;

a heating register which is arranged in the secondary section;

a primary section valve which is arranged between the refrigerant compressor and the external heat exchanger;

a secondary section valve arranged between the refrigerant compressor and the heating register;

wherein the cooling system is operated with a method for defrosting the external heat exchanger according to any one of the preceding claims.

13. A motor vehicle having a cooling system according to claim 12.

* * * * *